United States Patent [19]

Heshmat et al.

[11] Patent Number: 4,465,384
[45] Date of Patent: Aug. 14, 1984

[54] HIGH LOAD, WHIRL FREE, FOIL JOURNAL BEARING

[75] Inventors: Hooshang Heshmat, Granger, Ind.; Wilbur Shapiro; Stanley Gray, both of Schenectady, N.Y.

[73] Assignee: Mechanical Technology Incorporated, Latham, N.Y.

[21] Appl. No.: 470,218

[22] Filed: Feb. 28, 1983

[51] Int. Cl.³ ............................................. F16C 32/06
[52] U.S. Cl. ................................... 384/106; 384/119
[58] Field of Search ................. 384/99, 100, 103–106, 384/114, 119, 124, 125, 215

[56] References Cited

U.S. PATENT DOCUMENTS 4,262,975  4/1981  Heshmat ............................ 384/119
4,274,683  6/1981  Gray et al. ......................... 384/106
4,277,113  7/1981  Heshmat ............................ 384/124

Primary Examiner—Stuart S. Levy
Assistant Examiner—David Werner
Attorney, Agent, or Firm—Joseph V. Claeys; Arthur N. Trausch, III

[57] ABSTRACT

A hydrodynamic fluid film bearing having a series of axially aligned foil bearing modules which act in concert to extend the load carrying capability of the bearing assembly while providing whirl free operation.

11 Claims, 9 Drawing Figures

HIGH LOAD, WHIRL FREE, FOIL JOURNAL BEARING

BACKGROUND OF THE INVENTION

This invention relates to a compliant hydrodynamic fluid film bearing and, in particular, to a foil bearing assembly having an increased load carrying capability.

As is well known, compliant hydrodynamic fluid film bearings are old in the art and are typically used in high speed, low load carrying applications. As disclosed in U.S. Pat. No. 4,300,806, some of the newer bearings utilize a pair of superimposed foil strips that are secured by a common joint in registration at one end to the inside wall of the bearing sleeve. The trailing end of the two piece sandwich is then circumferentially wrapped about the shaft. The foil unit includes an underlying resilient support foil, sometimes referred to as a bump foil, having a wave-like configuration with the peaks and valleys of the waves being aligned with the axis of the shaft. Overlying the bump foil is a flat top foil that serves as a flexible interface between the bump foil and the outer periphery of the rotor shaft. Rotation of the shaft produces a wedge shaped buildup of air between the top foil and the shaft. This, in turn, produces an increase in the hydrodynamic pressure of the entrained air that lifts the shaft away from the compliant foil sandwich thus allowing the shaft to turn on a cushion of air.

In U.S. Pat. No. 4,274,683 there is disclosed a compliant hydrodynamic bearing assembly wherein three parallel strips of bump foil are positioned beneath a single strip of top foil. In this arrangement, the two outboard strips of bump foil are made more compliant than the center strip thus providing the bearing greater freedom to deflect in conformity with a misaligned rotor. This arrangement also increases the bearing's load handling capacity in the misaligned situation. However, the use of a single strip of top foil gives rise to whirl problems when the axial length of the bearing exceeds some predeterminable dimension. It should be further noticed that each of the foil elements are attached to the bearing sleeve along a common axial joint. Load direction that moves the shaft in the direction of the joint should be avoided since load capability in this direction is reduced.

In many applications where a hydrodynamic fluid film bearing might be extremely attractive, high load carrying capabilities are required along with relatively whirl free performance. However, these two bearing characteristics are generally diametrically opposed when considering foil bearings. Any increase in the bearing length that is required for handling higher loads produces a corresponding decrease in the bearing's whirl stability. It should be also noted that the bearing's ability to accommodate misaligned shafts also decreases with the bearing length. Increasing the length of the bearing further gives rise to temperature related problems and/or failures in that the longer bearings are prone to generate and retain a substantial amount of heat. Accordingly, foil bearings have not heretofore found wide applications where high load carrying capability is a primary consideration.

Summary of the Invention

It is therefore a primary object of the present invention to improve hydrodynamic fluid film bearings.

A further object of the present invention is to increase the load carrying capacity of a hydrodynamic fluid film bearing.

A still further object of the present invention is to increase the load carrying capacity of a hydrodynamic fluid film bearing without adversely affecting the whirl stability of the bearing.

Yet a further object of the present invention is to provide a high load foil bearing that has the ability to accommodate substantial misalignment of the rotor shaft.

Another object of the present invention is to eliminate problems in foil bearing applications associated with localized loading of the bearing over the bearing joint.

A still further object of the present invention is to provide a foil bearing that has both good damping qualities and uniform stiffness.

Another object of the present invention is to provide a long foil bearing that is not adversely affected by excessive temperatures due to viscous heat generation.

These and other objects of the present invention are attained by means of a compliant hydrodynamic fluid film bearing that includes an elongated bearing sleeve having a rotor shaft rotatably received therein so as to define a gap between the inner wall surface of the sleeve and the outer periphery of the shaft, a series of foil bearing modules axially aligned along the shaft within the gap, each module containing a resilient support foil and an overlying top foil that are secured in registration to the inner wall of the sleeve along a common joint, a radially disposed channel between each of the modules that is in fluid flow communication with said modules for relieving the bearings of excessive fluid film temperature rise, and each of the modules being angularly displaced in the gap to equally space the securing joints about the inner periphery of the sleeve and thus distribute the stiffness of the assembly more uniformly about the shaft and enhance resistance to whirl instability.

BRIEF DESCRIPTION OF THE DRAWINGS

For a better understanding of these and other objects of the present invention, reference is had to the following detailed description of the invention that is to be read inconjunction with the accompanying drawings wherein.

DESCRIPTION OF THE INVENTION

Figure 1:
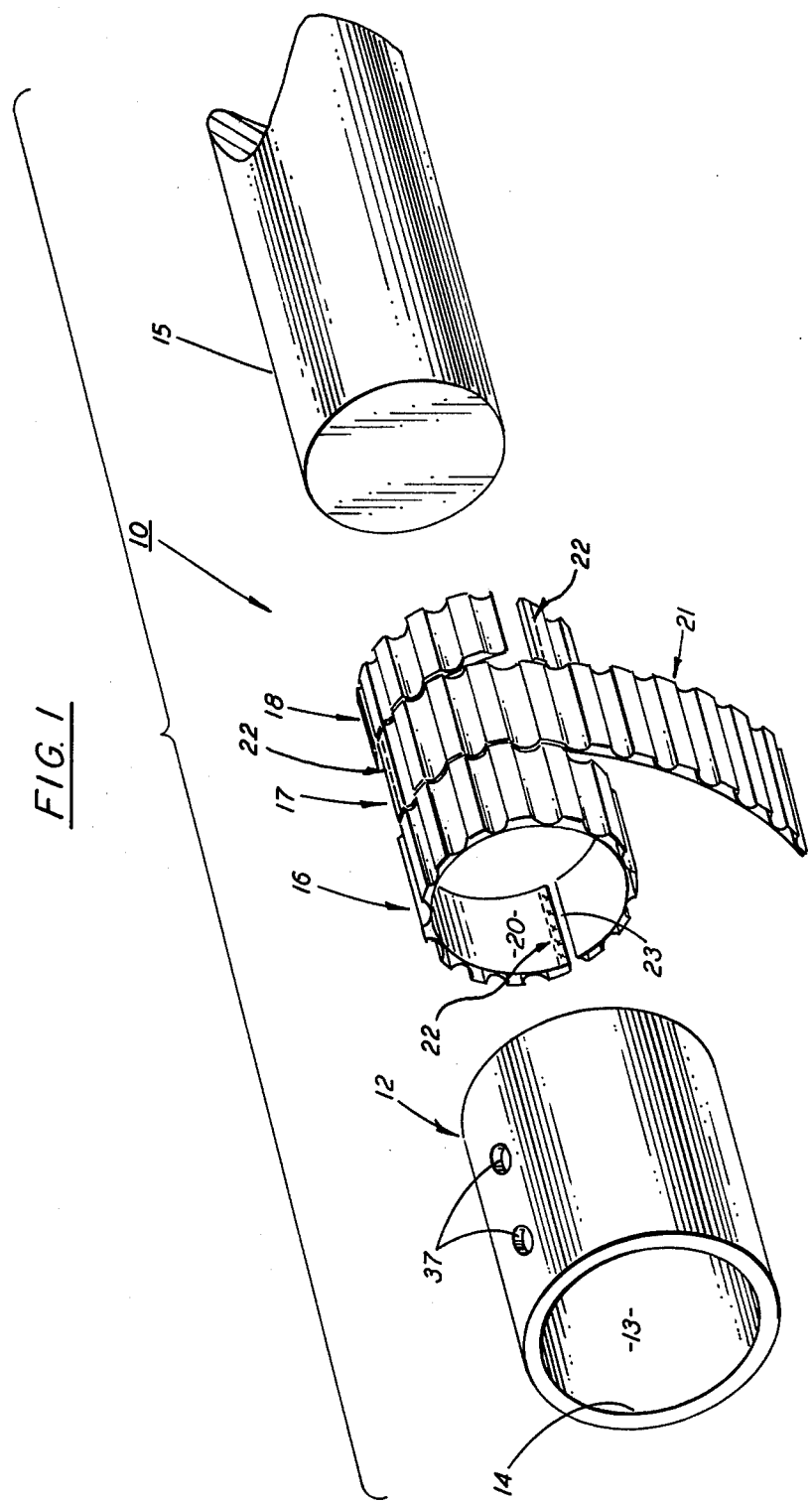
FIG. 1 is an exploded view in perspective showing a foil bearing assembly embodying the teachings of the present invention.
Figure 2:
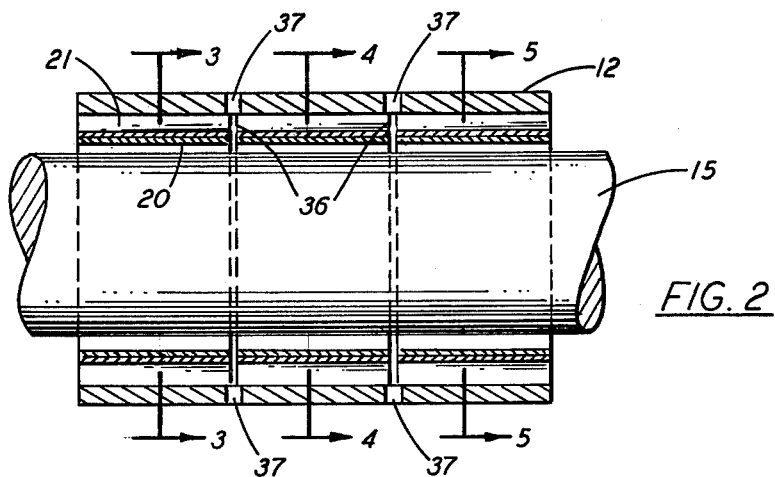
FIG. 2 is a side elevation in section showing the foil bearing assembly of FIG. 1 contained within the bearing sleeve.

Referring initially to FIG. 1, there is depicted in an exploded perspective view a compliant hydrodynamic fluid film journal bearing assembly, generally referenced 10, which embodies the teachings of the present invention. The bearing assembly includes an elongated bearing sleeve 12 that contains an axially aligned hole 13 bored or otherwise formed therethrough for loosely receiving a rotor shaft 15. Although not shown, it should be understood for purposes of this explanation that the rotor structure is designed to turn at relatively high speeds and produce high loading on the journal bearing. Accordingly, the bearing is required to carry higher loads than normally are carried by more conventional foil bearings known in the prior art.

In assembly, a gap is furnished between the inner wall surface 14 of the bearing sleeve and the outer periphery of the shaft into which is fitted a modular foil bearing section 12. The modular foil bearing section contains a series of individual axially aligned foil bearing modules, each of which is able to independently generate a fluid film for supporting the turning shaft upon a cushion of air. As will be explained in greater detail below, the axial length of each module is small enough to ensure whirl free performance at the expected shaft speed while the combined axial length of the modular array is great enough to enable the assembly to carry relatively high rotor loads.

With further reference to FIGS. 2—5, the modular foil bearing section 12 of the present embodiment includes three modules which include left hand module 16, central module 17 and right hand module 18. It should be understood that although three modules are employed in the present embodiment, the number can be varied depending upon design consideration, without departing from the teachings of the invention. Each module is similarly constructed and contains a pair of thin foil strips that are superimposed in registration about the shaft in a sandwich-like configuration. The underlying strip 21 of the sandwich is a resilient support element, or bump foil, having a wave-like configuration. The foil element contains a series of equally spaced flat sections 26—26, that are adapted to rest against the inner wall of the bearing sleeve. The flat sections are cojoined by means of arcuately shaped spring elements 27—27 which protrude inwardly toward the shaft. In practice, the bump foil strip is formed from a single sheet of annealed metal that has been heated to furnish the strip with the desired resiliency and strength. The overlying strip or top foil 20, is a flat continuous sheet of flexible foil that is positioned, in assembly, between the bump foil and the shaft.

The foil sandwich making up each module is secured at one end to the inner wall of the bearing sleeve by means of a weld joint 22 that is disposed axially along the sleeve. The trailing body section of the sandwich is circumferentially wrapped about the shaft and a small space 23 is furnished between the two ends of the sandwich. Space 23 not only permits the bearing to move in compliance with the shaft but also provides some relief to high pressure fluid entrained beneath the bearing. Each weld joint 22 includes a spacer pad 25 for connecting the bump foil and the top foil in assembly. As illustrated, the secured end of the bump foil is welded to the bottom surface of the pad while the top foil is similarly affixed to the top surface thereof. The entire joint assembly is, in turn, securely affixed to the inner wall of the sleeve.

Among other things, the raised spacer pad provides the bearing module with a non-uniform circumferential stiffness which is important in the design of the foil bearing in order to avoid excitation of the bearing at natural frequencies and to furnish overall good damping properties. Maximum stiffness for a bearing utilizing a uniform pitch bump foil and a raised pad of the type herein described occurs in the region adjacent to the pad as noted in FIGS. 3—5. The stiffness of the foil unit decreases progressively from this area of maximum stiffness toward the free end of the foil sandwich.

The arcuate shaped projections on the bump foil provides resiliency to each module and thus allows each module to independently deflect to accommodate varying load distributions. The bump-like projections, acting in concert with the top foil, also enables each bearing module to assume a configuration which promotes the creation of a hydrodynamic fluid film wedge that is capable of helping to support the total bearing load as the shaft turns at high speed. Due to the compliant nature of the bearing modules, each module will further conform to the contour of the rotor shaft as it experiences dimensional changes caused by either centrifugal or thermal growth.

The axial width of each module is such that high pressure gases generated between the top foil and the shaft can be relieved not only centrifically but also axially into adjacent relief channels 36—36 provided between the modules thereby providing for excellent whirl stability across the entire assembly. Feed holes 37—37 are passed through the sleeve wall which communicate with the relief channels and allow cooling air to be delivered into the assembly at a number of different points. Although not shown, the feed holes are connected to supply lines which bring cooling air from any suitable supply source to the bearing thus reducing the bearing temperature.

Figures 3, 4:
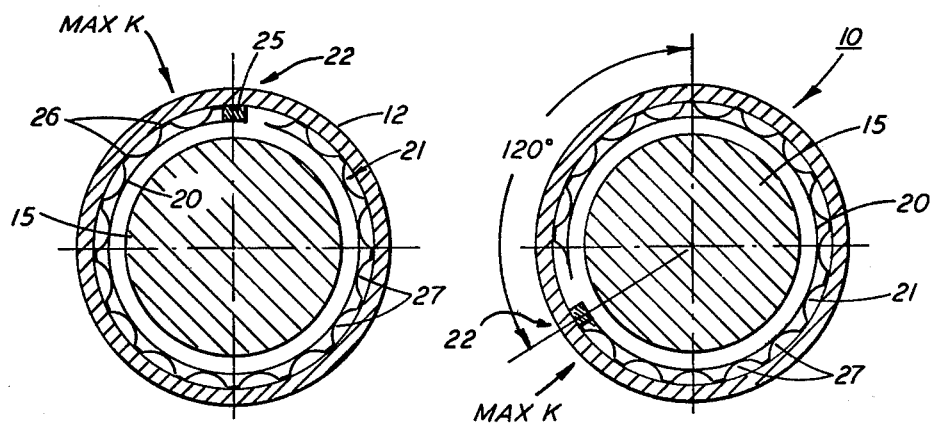
FIG. 3 is a section taken along line 3—3 in FIG. 2 showing the left hand bearing module of the assembly.
FIG. 4 is a section taken along line 4—4 in FIG. 2 showing the central bearing module of the assembly.
Figure 5:
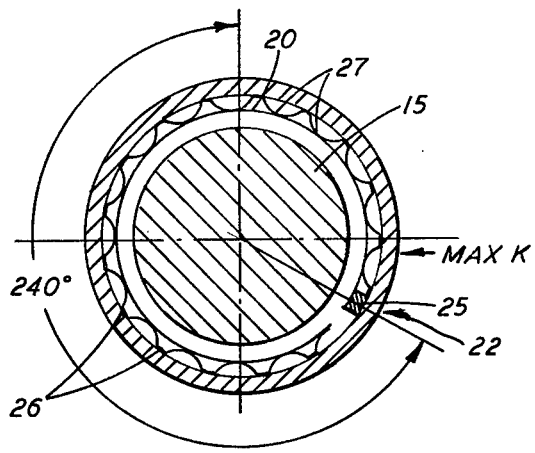
FIG. 5 is a section taken along line 5-5 in FIG. 2 showing the right hand bearing module of the assembly.

Although each bearing module, as explained above, exhibits a non-uniform stiffness response, the modules are arranged in assembly to more evenly distribute this response about the shaft. As best illustrated in FIGS. 3—5, the modules are each angularly displaced in assembly so that the weld joints at the secured end of each module sandwich are equally spaced at 120° intervals about the inner periphery of the sleeve. As should be evident, by angularly offsetting the modules as shown, a more uniform overall stiffness response is provided to the bearing assembly without having to sacrifice the dampening quality of each individual module.

By modulizing the bearing assembly as described above, the assembly is better able to accommodate a misaligned rotor. The accommodation of the bearing assembly can be further extended by making the outboard modules softer or more compliant than the interior module or modules, as the case may be. As can be seen, the outboard modules are required to deflect a greater amount than the interior units by the misaligned shaft. Accordingly, by making these outboard units slightly more compliant than the interior units, greater rotor misalignment can be tolerated by the bearing without appreciably affecting performance.

Figure 6:
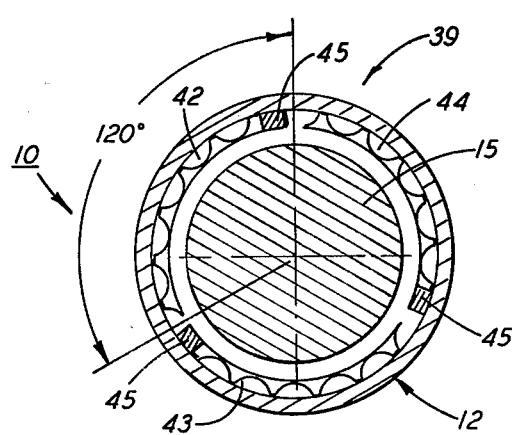
FIGS. 6—8 are sections similar to those shown in FIGS. 3—5 wherein each bearing module is a three pad unit.
Figure 7:
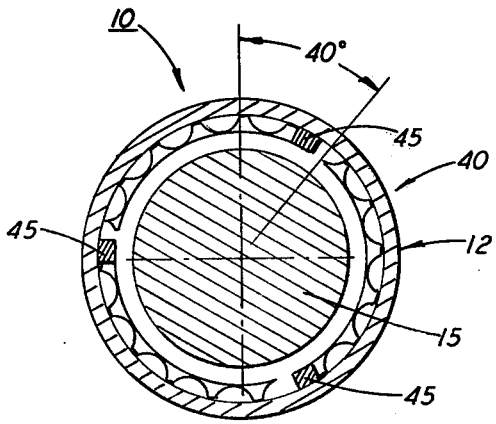
Figure 8:
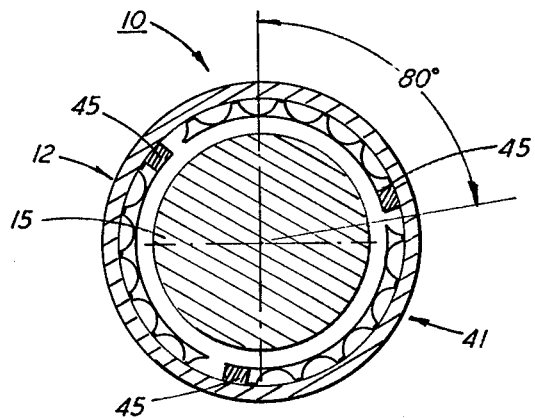

Turning now to FIGS. 6—8, there is shown a second embodiment of the invention wherein three bearing modules are axially aligned along the shaft 15 beneath a single bearing sleeve 12 in the manner described above. In this particular arrangement, each module is a three pad bearing unit. Each module thus contains three spacer pads 45 equally spaced about the circumference of the inner wall of the sleeve. The pads are used to both position and support foil sandwiches made up of a top foil 47 and a bump foil 48 in an end to end alignment about the shaft. Because the three pad arrangement has inherent whirl resistance, this embodiment of the invention further enhances the whirl stability of the assembly without detracting from its increased load carrying capability.

A more uniform overall stiffness response is also obtained using this three pad arrangement. As illustrated, each of the modules is angularly displaced in assembly 40° in regard to the adjacent module. This, in turn, provides for the bearing joints to be positioned every 40° about the bearing sleeve so that the areas of maximum stiffness associated with the bearing units are presented to the shaft at a series of equally spaced locations about the shaft's periphery. Here again, the load carrying capacity of the bearing is extended without adversely affecting whirl stability while, at the same time, providing for a more uniform stiffness response.

Figure 9:
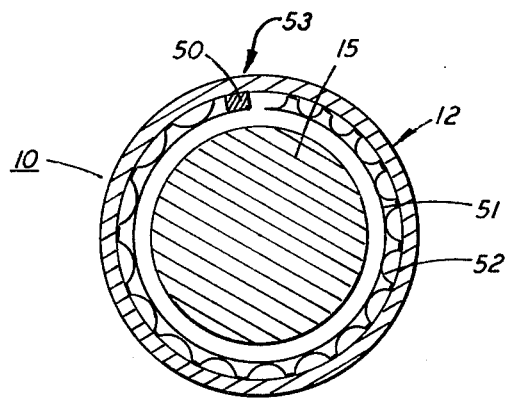
FIG. 9 is a sectional end view of a bearing module suitable for use in the present invention showing a variable pitch bump foil.

FIG. 9 shows a module configuration that is also suitable for use in a high load, whirl free, self-aligning foil journal bearing of the type herein disclosed. In this particular arrangement, one or more bearing modules making up the assembly contains a bearing sheet 51 and a bump foil 52 that are secured to a spacer block 50 in a conventional manner to provide an axial joint 53. The block, in turn, is secured to the sleeve 12 and the foils wrapped freely about the shaft 15 as explained above. In this arrangement, the bump foil is configured so that the circumferential length or span of the bumps decreases in proportion to the distance the bump is located from the bearing joint. Accordingly, the location of the bumps may be varied to control the stiffness about each of the modules.

While this invention has been described with reference to the details as set forth above, it is not limited to the specific structure as disclosed and the invention is intended to cover any modifications or changes as may come within the scope of the following claims.

We claim:

1. A compliant hydrodynamic fluid film bearing assembly that includes
    an elongated sleeve housing a rotor shaft to provide a gap between the inside wall of the sleeve and the outer periphery of the shaft,
    a plurality of independent spaced apart foil bearing units that are axially aligned within the gap in a non-contiguous relationship, each of said bearing units including a foil sandwich having a support sheet facing the shaft and a superimposed bump foil positioned between the support sheet and inside wall of the sleeve, each sandwich being secured at one end to the said inside wall of the sleeve by an axially disposed joint with the trailing section of the sandwich circumferentially wrapped about the shaft,
    said axially disposed joints being spaced apart axially to provide a relief channel between each of the adjacent bearing units, said channel extending from the surface of the shaft to the inside wall of the sleeve and the joints of adjacent bearing units being angularly displaced one from the other about the circumference of the sleeve whereby the joints are staggered about the periphery of the sleeve.

2. The assembly of claim 1 wherein each bump foil contains a series of raised compliant projections and is separated at the joint from the support sheet by an axially disposed pad.

3. The assembly of claim 2 wherein the projections are equally spaced along the circumferential length of the bump foil.

4. The assembly of claim 2 wherein the spacing between the projections varies along the circumferential length of the bump foil to provide maximum stiffness in a preferred region.

5. The assembly of claim 1 wherein each bearing unit contains a plurality of foil sandwiches mounted end to end about the circumference of the shaft.

6. The assembly of claim 1 wherein the bearing assembly contains two end bearing units that are more compliant than the bearing units positioned therebetween.

7. The assembly of claim 1 wherein the sleeve contains an opening passing therethrough that communicates with the relief channels located between adjacent bearing units.

8. The method of supporting a rotor shaft within a journal bearing sleeve that includes the steps of
    mounting a plurality of independent foil bearing units in axial alignment along the shaft beneath the sleeve so that the combined length of the units is sufficient to carry the bearing load,
    providing each bearing unit with a support sheet that faces the shaft and a superimposed bump foil positioned between the support sheet and the sleeve,
    axially spacing the bearing units along the shaft so that a relief channel extending between the periphery of the shaft and the inside wall of the sleeve is provided between each adjacent unit,
    joining one end of each foil sandwich to the inside wall of the sleeve and permitting the trailing section of the sandwich to wrap circumferentially about the shaft, and
    angularly displacing the joints of adjacent units about the inside wall of the sleeve.

9. The method of claim 8 that further includes the step of providing the two outside bearing units with a more compliant bump foil than the units positioned therebetween.

10. The method of claim 8 that further includes the step of introducing a coolant into each relief channel.

11. The method of claim 8 that includes the further step of positioning a series of foil sandwiches in end to end alignment within each bearing unit.

* * * * *